United States Patent
Du et al.

(10) Patent No.: US 8,848,980 B2
(45) Date of Patent: Sep. 30, 2014

(54) FRONT VEHICLE DETECTING METHOD AND FRONT VEHICLE DETECTING APPARATUS

(71) Applicants: Cheng Du, Beijing (CN); Liyan Liu, Beijing (CN); Xiaomeng Wang, Beijing (CN); Ping Hu, Beijing (CN)

(72) Inventors: Cheng Du, Beijing (CN); Liyan Liu, Beijing (CN); Xiaomeng Wang, Beijing (CN); Ping Hu, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 18 days.

(21) Appl. No.: 13/630,166

(22) Filed: Sep. 28, 2012

(65) Prior Publication Data

US 2013/0083971 A1   Apr. 4, 2013

(30) Foreign Application Priority Data

Sep. 30, 2011   (CN) .......................... 2011 1 0297126

(51) Int. Cl.
*G06K 9/00* (2006.01)

(52) U.S. Cl.
CPC .................................. *G06K 9/00825* (2013.01)
USPC ........... 382/103; 382/100; 382/104; 382/181; 348/148; 348/154; 701/1; 701/300; 701/301

(58) Field of Classification Search
None
See application file for complete search history.

(56) References Cited

U.S. PATENT DOCUMENTS

| | | | | |
|---|---|---|---|---|
| 5,837,994 A * | 11/1998 | Stam et al. | ................. | 250/208.1 |
| 6,587,573 B1 * | 7/2003 | Stam et al. | ................... | 382/104 |
| 6,611,610 B1 * | 8/2003 | Stam et al. | ................... | 382/104 |
| 6,653,614 B2 * | 11/2003 | Stam et al. | ................. | 250/208.1 |
| 7,429,825 B2 | 9/2008 | Kubota et al. | | |
| 7,512,252 B2 | 3/2009 | Otsuka et al. | | |
| 7,759,819 B2 * | 7/2010 | Michiyama et al. | ......... | 307/10.8 |
| 7,936,904 B2 * | 5/2011 | Furusawa | ...................... | 382/104 |
| 7,949,190 B2 * | 5/2011 | Wu et al. | ....................... | 382/206 |
| 8,194,998 B2 * | 6/2012 | Saito | ............................. | 382/274 |
| 2003/0063913 A1 | 4/2003 | Yamazaki | | |
| 2005/0036660 A1 * | 2/2005 | Otsuka et al. | ................. | 382/104 |
| 2007/0263901 A1 * | 11/2007 | Wu et al. | ....................... | 382/104 |
| 2008/0055662 A1 | 3/2008 | Maezawa | | |
| 2008/0253616 A1 * | 10/2008 | Mizuno et al. | ................ | 382/105 |
| 2008/0259399 A1 | 10/2008 | Wada | | |
| 2010/0033571 A1 * | 2/2010 | Fujita et al. | ................... | 348/149 |
| 2010/0214600 A1 | 8/2010 | Yagi | | |
| 2010/0332823 A1 | 12/2010 | Tsujimoto | | |
| 2011/0164789 A1 * | 7/2011 | Robert | .......................... | 382/104 |

FOREIGN PATENT DOCUMENTS

| | | | |
|---|---|---|---|
| EP | 1091562 A1 | 4/2001 | |
| EP | 2110739 A1 | 10/2009 | |

OTHER PUBLICATIONS

European Search Report dated Feb. 17, 2014.
Extended European Search Report dated May 28, 2014.

(Continued)

*Primary Examiner* — Matthew Bella
*Assistant Examiner* — Jason Heidemann
(74) *Attorney, Agent, or Firm* — Harness, Dickey & Pierce, P.L.C.

(57) ABSTRACT

A method for detecting a front vehicle comprises: a moving light detecting step of detecting a front moving light area of an own vehicle in at least one image of a front scene of the own vehicle obtained at a time; a vehicle candidate generating step of extracting a light area pair from the detected front moving light area so that a front vehicle candidate is generated; and a vehicle candidate verifying step of verifying that the front vehicle candidate is the front vehicle in cases where the front vehicle candidate meets predetermined characteristics of a vehicle light.

6 Claims, 11 Drawing Sheets

(56) References Cited

OTHER PUBLICATIONS

Schamm, T. et al., "On-Road Vehicle Detection during Dusk and at Night," Intelligent Vehicles Symposium, pp. 418-423, Jun. 21, 2010.

Alt, N. et al., "Hardware/software architecture of an algorithm for vision-based real-time vehicle detection in dark environments," Automation and test in Europe, pp. 176-181, Mar. 10, 2008.

Chem, M-Y. et al., "The Lane Recognition and Vehicle Detection at Night for a Camera-Assisted Car on Highway," IEEE International Conference on Robotics and Automation, col. 2, pp. 2110-2115, Sep. 14, 2003.

Fossati, A. et al., "Real-time vehicle tracking for driving assistance," Machine Vision and Applications, vol. 22, No. 2, pp. 439-448, Jan. 23, 2010.

Borkar, A. et al., "A Layered Approach to Robust Lane Detection At Night," Computational Intelligence in Vehicles and Vehicular Systems, pp. 51-57, Mar. 30, 2009.

* cited by examiner

FRONT VEHICLE DETECTING METHOD AND FRONT VEHICLE DETECTING APPARATUS

BACKGROUND OF THE INVENTION

1. Field of the Invention

The present invention relates to a vehicle detecting method and a vehicle detecting apparatus, and more particularly to a front vehicle detecting method and a front vehicle detecting apparatus.

2. Description of the Related Art

One of the major reasons for traffic accidents is nighttime driving, because the vision of a driver in the nighttime is worse than that in the daytime. In the nighttime driving, it is possible to provide better vision for the driver by a high-beam of the vehicle headlights. On the other hand, the high-beam may have an influence on a driver on the opposite side, and it may bring danger to the driver on the opposite side. It may be rather inconvenient for the driver to switch frequently by hand between high-beam and low-beam.

U.S. Pat. No. 7,512,252B2 discloses a vehicle detecting system, in which a long time exposure and a short time exposure are conducted respectively by an onboard camera so as to obtain two images, and taillights, headlights, and other lights (for example, signal lights or street lights) are identified by using image characteristics in the two images having different exposures.

The above patent (U.S. Pat. No. 7,512,252B2) relies on a condition that in JAPAN traffic keeps to the left and an assumption that the headlight is located in the right side of the image and the taillight is located in the left side of the image; however, as for the practical reality of road conditions, the road is not always straight and the road may have plural lanes, so that the assumption is not always correct. Furthermore, the above patent (U.S. Pat. No. 7,512,252B2) determines whether the light comes from the vehicle or not by comparing the location relationship between a vanishing point and the detected light; however, the assumption is not always correct in the case of an uneven road (for example, a slope). In addition, in the above patent (U.S. Pat. No. 7,512,252B2), the taillight appears only in an image having a long time exposure by controlling exposure intensity; however, the intensity of the light has relationships with both (1) a condition that the light is a headlight or taillight and (2) the distance between the light and the own vehicle. For example, the intensity of the taillight of the vehicle in the near distance may be higher and the light of the taillight of the vehicle in the near distance may be brighter than the headlight of the vehicle beyond. Therefore, the assumption is not always correct.

Furthermore, U.S. Pat. No. 7,429,825B2 discloses a vehicle light control system, comprising: a rear vehicle information catching module for catching the information of a vehicle behind the own vehicle; an overtaking forecasting module for forecasting whether the rear vehicle overtakes the own vehicle or not based on the information of the rear vehicle; a mode change condition determining module for determining whether a predetermined mode change condition is met or not based on the forecasted overtaking; and an automatic mode setting module for bringing out the automatic changeover between the high-beam and the low-beam in cases where the predetermined mode change condition is met.

However, in the vehicle light control system of U.S. Pat. No. 7,429,825B2, the detection based on the white line of the road (lane) in the nighttime merely detects the rear vehicle in the same lane with the own vehicle, but cannot detect the front vehicle of the own vehicle.

Therefore, it is necessary to provide a method and an apparatus by which the front vehicle of the own vehicle can be detected in the nighttime.

SUMMARY OF THE INVENTION

The present invention is made in light of the above problems, and may provide a method and an apparatus for detecting the front vehicle of the own vehicle by detecting a moving light in front of the own vehicle and determining whether the moving light meets predetermined characteristics of a vehicle light or not.

According to an aspect of the present invention, a method for detecting front vehicle, comprises: a moving light detecting step of detecting a front moving light area of an own vehicle in at least one image of a front scene of the own vehicle obtained at a time; a vehicle candidate generating step of extracting a light area pair from the detected front moving light area so that a front vehicle candidate is generated; and a vehicle candidate verifying step of verifying that the front vehicle candidate is the front vehicle in cases where the front vehicle candidate meets predetermined characteristics of a vehicle light.

Preferably, in the front vehicle detecting method, the moving light detecting step comprises: a light area extracting step of extracting a light area from a first image of the at least one image; a distance calculating step of calculating a distance between the extracted light area and the own vehicle; a light area matching step of matching the extracted light area with a light area of a first image of at least one image obtained at a previous time; and a moving light determining step of determining the obtained light area as the front moving light area in cases where the obtained light area meets predetermined characteristics of a moving light area.

Preferably, the front vehicle detecting method, before the vehicle candidate generating step, further comprises: a step of detecting a vehicle layer in a first image of the at least one image; and a step of eliminating a moving light area appearing above the vehicle layer.

Preferably, in the front vehicle detecting method, the vehicle candidate generating step comprises: a light pair extracting step of constituting the light area pair by approximately symmetric light areas having a similar speed in a first image of the at least one image; and a light pair combining step of combining the light areas that constitute the light area pair into one area so that the front vehicle candidate is obtained.

Preferably, the front vehicle detecting method, after the light pair extracting step, further comprises: a step of generating a straight line across each of the light area pairs, calculating the gradients of the straight lines, and calculating the numbers of light crossed by the straight lines; a step of detecting the straight line that crosses the most lights; and a step of removing the lights crossed by the straight line that crosses the most lights in cases where the gradient of the straight line that crosses the most lights is within a predetermined gradient range.

Preferably, the front vehicle detecting method further comprises: a vehicle chasing step of matching a location of the front vehicle determined in a first image of the at least one image to a location of the front vehicle determined in a first image of at least one image obtained at a previous time so as to track the location of the front vehicle.

According to another aspect of the present invention, an apparatus for detecting a front vehicle, comprises: a moving light detecting unit for detecting a front moving light area of an own vehicle in at least one image of a front scene of the own vehicle obtained at a time; a vehicle candidate generating unit for extracting a light area pair from the detected front moving light area so that a front vehicle candidate is generated; and a vehicle candidate verifying unit for verifying that the front vehicle candidate is the front vehicle in cases where the front vehicle candidate meets predetermined characteristics of a vehicle light.

Preferably, in the front vehicle detecting apparatus, the moving light detecting unit comprises: a light area extracting unit for extracting a light area from a first image of the at least one image; a distance calculating unit for calculating a distance between the extracted light area and the own vehicle; a light area matching unit for matching the extracted light area with a light area of a first image of at least one image obtained at a previous time; and a moving light determining unit for determining the obtained light area as the front moving light area in cases where the obtained light area meets predetermined characteristics of a moving light area.

Preferably, in the front vehicle detecting apparatus, the vehicle candidate generating unit comprises: a light pair extracting unit for constituting the light area pair by approximately symmetric light areas having a similar speed in a first image of the at least one image; and a light pair combining unit for combining the light areas that constitute the light area pair into one area so that the front vehicle candidate is obtained.

Preferably, the front vehicle detecting apparatus further comprises: a vehicle chasing unit for matching a location of the front vehicle determined in a first image of the at least one image to a location of the front vehicle determined in a first image of at least one image obtained at a previous time so as to track the location of the front vehicle.

According to the method and the apparatus for detecting the front vehicle, the front vehicle of the own vehicle can be accurately detected by detecting the moving light and verifying whether the detected moving light meets the characteristics of the vehicle light or not.

BRIEF DESCRIPTION OF THE DRAWINGS

The above object and other objects, features, advantages and industrial importance of the present invention will become more apparent from the following detailed description when read in conjunction with the accompanying drawings.

DETAILED DESCRIPTION OF THE PREFERRED EMBODIMENTS

In the following, a front vehicle detecting method and apparatus according to an embodiment of the present invention are described with reference to the accompanying drawings.

Figure 1:
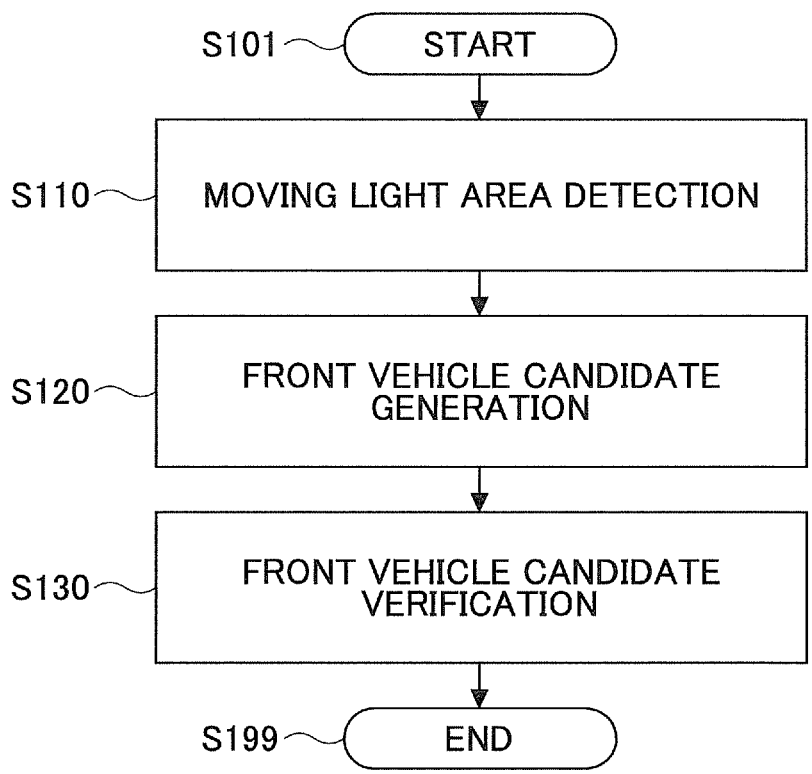
FIG. 1 is a flowchart illustrating the front vehicle detecting method according to an embodiment of the present invention.

First, FIG. 1 is a flowchart illustrating a method 100 for detecting the front vehicle of an own vehicle according to the embodiment of the present invention.

The method 100 for detecting the front vehicle according to the embodiment of the present invention begins in step S101.

In step S110, a moving light area in front of the own vehicle is detected through at least one image of a front scene of the own vehicle obtained at a time.

Next, in step S120, a light area pair is extracted from the detected front moving light area so that a front vehicle candidate is generated.

After that, in step S130, the front vehicle candidate is verified as the front vehicle in cases where the front vehicle candidate meets predetermined characteristics of a vehicle light.

As an example, in step S130, the front vehicle candidate is verified by a Support Vector Machine (SVM). In the preprocessing, the image characteristics (such as length-width ratio, histogram, edge characteristics, and projection characteristics, etc.) are extracted so as to train a SVM classifier. In the process of the verification, the same characteristics are extracted as the input of the SVM classifier, from each of the front vehicle candidates obtained in step S120. After that, the SVM classifier outputs 1 or −1 to indicate whether the front vehicle candidate is a vehicle light (vehicle) or not. For example, SVM outputting 1 means the front vehicle candidate is the vehicle light (vehicle), while outputting −1 means the front vehicle candidate is not the vehicle light (vehicle).

As another example, in step S130, the front vehicle candidate is verified by Principal Component Analysis (PCA). In the preprocessing, a few image blocks which include only the vehicle light are selected so as to train eigenvectors of the vehicle image space, and another set of vehicle light images are projected to an eigenspace consisting of the eigenvectors so as to obtain projecting vector collection T. In the process of the verification, each of front vehicle candidates obtained in step S120 is projected to the eigenspace obtained by training so as to obtain the projecting vectors. After that, the distances between the projecting vectors and each of projecting vectors in the projecting vector collection T are calculated. If minimum distance is less than a predetermined threshold, the current front vehicle candidate is determined to be the detected front vehicle; otherwise, the current front vehicle candidate is regarded as noise light.

Finally, the method 100 for detecting the front vehicle according to the embodiment of the present invention finishes in step S199.

Figure 2:
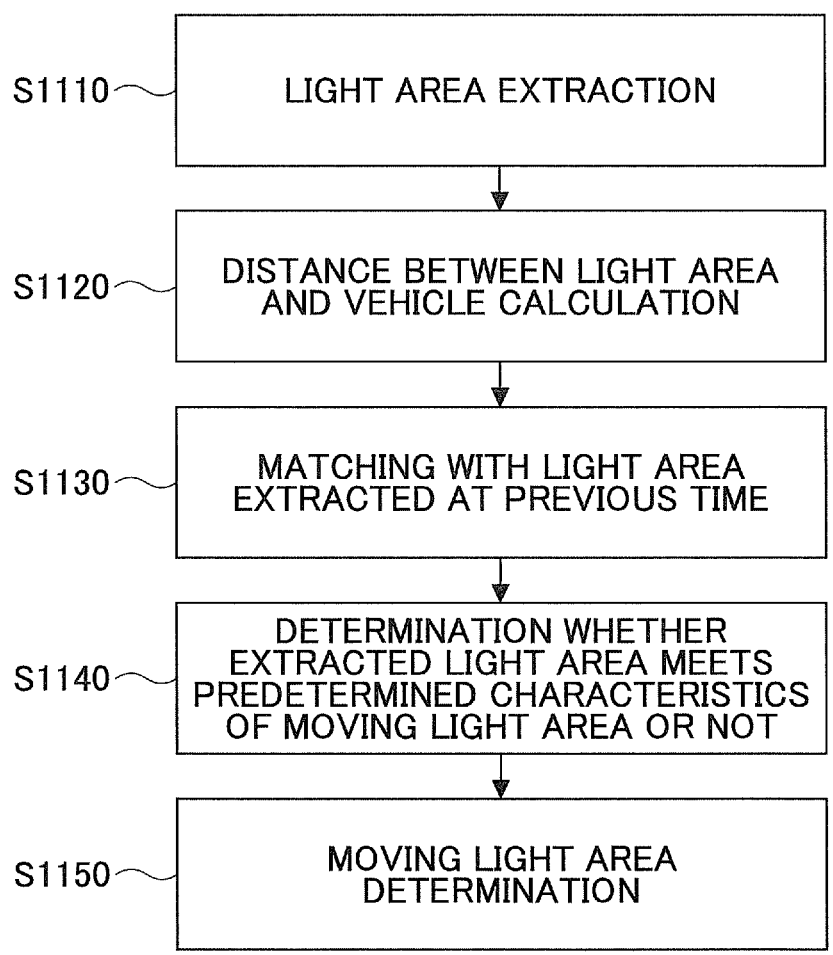
FIG. 2 is a flowchart illustrating the moving light area detection according to the embodiment of the present invention.

FIG. 2 is a flowchart illustrating the moving light area detection of step S110 in FIG. 1.

First, in step S1110, a light area in a first image of the at least one image is extracted.

Next, in the step S1120, a distance $D_t$ between the extracted light area and the own vehicle is calculated.

It has been noted that a lot of other lights and vehicle light are physically very similar, such as the light of buildings, street light and light of a reflecting plate, etc. Because these lights are regarded as noise lights, the difficulty of vehicle light location detection in a single image is increased.

Accordingly, preferably, in step S1120, the distance between the extracted light area and the own vehicle is calculated by using at least two images, namely, at least two images having fixed parallax picked up by at least two webcams (such as a binocular webcam).

Alternatively, a single image may be picked up by a single webcam, and the distance between the extracted light area and the own vehicle may be measured by other ways such as infrared distance measurement, etc.

After that, in step S1130, the extracted light area is matched to a light area of a first image of at least one image obtained at a previous time.

As an example, in step S1130, the histogram of each of the extracted light areas is calculated by the method of template matching, the nearest areas to each of the extracted light areas from a responding image obtained at a previous time are searched, histograms of each image block in the nearest areas are calculated, and histograms of the extracted light areas are compared with the calculated histograms of each image block. The calculation formula is defined as the following formula (1).

$$SD = \sum_{i=1}^{bins} (H_t[i] - H_{k,t-1}[i])^2$$

In formula (1), SD is the distance between the two histograms, $H_t[i]$ is the i-th value of histograms of the light areas extracted from the current image, $H_{k,t-1}[i]$ is the i-th value of histograms of the k-th image block of the nearest areas in the image obtained at the previous time, and bins is the number of grey levels of histograms, such as 256. If the smallest SD value is less than a predetermined threshold, it is considered a successful matching between the extracted light area and the image block (namely, light area) corresponding to the smallest SD value in the nearest areas.

Next, in step S1140, it is determined whether the extracted light area meets predetermined characteristics of a moving light area or not.

Finally, in step S1150, the extracted light area is determined to be the front moving light area.

As an example, in step S1140, the moving speed $V_{light}$ of the extracted light area is calculated by using the distance $D_t$, the distance $D_{t-1}$ between light area matched at the previous time and the own vehicle, and the moving speed $V_t$ of the own vehicle. The calculation formula is defined as the following formula (2).

$$V_{light}=(D_t-D_{t-1})/\Delta t+V_t$$

Furthermore, in step S1140, it is determined whether the moving speed is more than a predetermined threshold. After that, in step S1150, the light area there the moving speed is more than the predetermined threshold, is regarded as the front moving light area.

As another example, in step S1140, it may be determined whether the size of the extracted light area is less than the size of a corresponding light area of a corresponding image obtained at the previous time or not. After that, in step S1150, if the size of the extracted light area is less than the size of the corresponding light area of the corresponding image obtained at the previous time, the extracted light area is regarded as the front moving light area.

As another example, in step S1140, it may be determined whether the distance between the extracted light area and a vanishing point is less than the distance between a corresponding light area of a corresponding image obtained at the previous time and the vanishing point or not. After that, in step S1150, if the distance between the extracted light area and the vanishing point is less than the distance between the corresponding light area of the corresponding image obtained at the previous time and the vanishing point, the extracted light area is regarded as the front moving light area and it is considered that the moving light area goes forward (namely, the same direction as the own vehicle). In view of the fact that the vanishing point of the image is well-known in the art, its description is omitted here.

Preferably, in step S1110, the first image (which is a grey level image, or is converted to a grey level image in advance) of the at least one image is converted to a binarized image, then the light area is extracted from the generated binarized image. However, the present invention is not limited to those steps described above, and there may be no need to convert the first image of the at least one image to the binarized image, but the light area may be extracted directly from the first image of the at least one image.

As an example, in step S1110, each pixel value of the grey level image of the first image of the at least one image is compared with a predetermined threshold T_Binarization. If the grey level of the current pixel is more than the threshold, set it to 255; otherwise, set the pixel value to 0. Thus, the corresponding binarizaed image is generated. After that, in the binarized image, the location and the size of all of the connect components (connect area) of the image are obtained by Connected Component Analysis (CCA), and the width and the height of each connect component is calculated. CC.width represents the width of the connected component, and CC.height represents the height of the connected component. T_CCWidth represents the threshold of width of the connected component, T_CCHeight represents the threshold of height of the connected component, and T_CCAspect represents the threshold of the ratio of width to height. If a connected component meets the following condition (formula (3)), it is regarded as a possible light area.

CC.width>T_CCWidth

CC.height>T_CCHeight

CC.width/CC.height<T_CCAspect

Furthermore, in view of the fact that the Connected Component Analysis (CCA) is well-known in the art, its description is omitted here.

It should be noted that the subsequent processing is done by using the first image, after the light area is extracted by using the binarized image of the first image.

Figure 3:
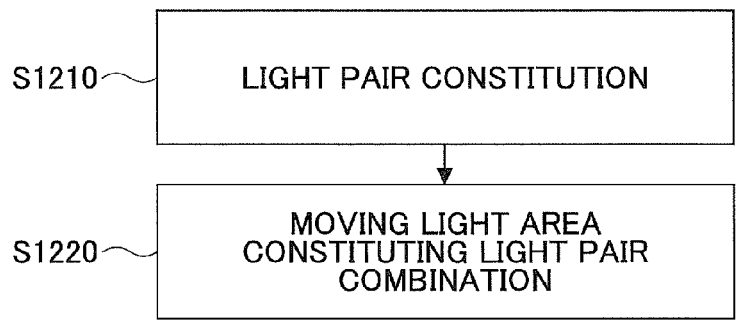
FIG. 3 is a flowchart illustrating the front vehicle candidate generation according to the embodiment of the present invention.

Next, FIG. 3 is a flowchart illustrating the front vehicle candidate generation of step S120 in FIG. 1.

First, in step S1210, in the first image, the light area pair is constituted by approximately symmetric light areas having a similar speed, after the front moving light area is detected.

Next, in step S1220, the light areas that constitute the light area pair are combined (merged) into one area so as to obtain the front vehicle candidate.

In addition, preferably, if the two light areas overlap each other in the vertical direction and the ratio of length to width of the bounding box rectangle consisting of the two light areas is less than a predetermined threshold, the two light areas are combined into one area.

As mentioned above, a lot of lights are physically very similar to vehicle light, such as the light of buildings, street light and light of a reflecting plate, etc. These lights are regarded as noise lights. It is possible that a few non-truly moving light areas may also exist in the moving light areas obtained in step S110, such as some of lights of buildings, some of street lights and some of lights of a reflecting plate, etc. Therefore, it is necessary to eliminate the non-truly moving light areas from the obtained moving light areas.

In the present invention, a method of vehicle layer extraction and a method of reflecting plate elimination are presented. In the method of vehicle layer extraction, "vehicle layer" is detected from the image, and the detected lights (such as some of street lights and some of lights of buildings) above the vehicle layer are eliminated as the noise; in the method of reflecting plate elimination, the "reflecting plate" is detected and eliminated from the image.

Figure 4:
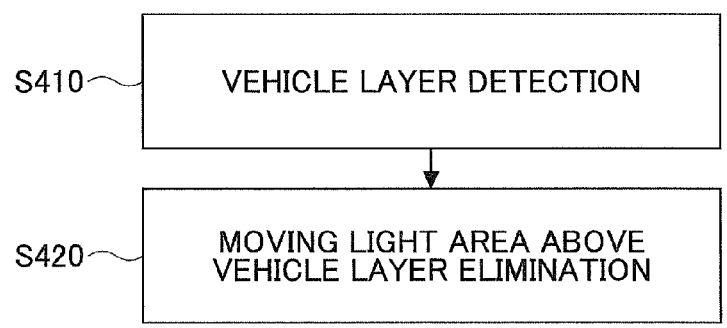
FIG. 4 is a flowchart illustrating the vehicle layer extraction according to the embodiment of the present invention.

FIG. 4 is a flowchart illustrating the vehicle layer extraction.

In step S410, the vehicle layer is detected from the first image. For example, the first image is divided into several layers in the horizontal direction from top to bottom, and the numbers of lights in each layer are calculated. If the number of lights in the layer having most lights is more than a predetermined threshold, the layer is defined as the vehicle layer.

Figure 5:
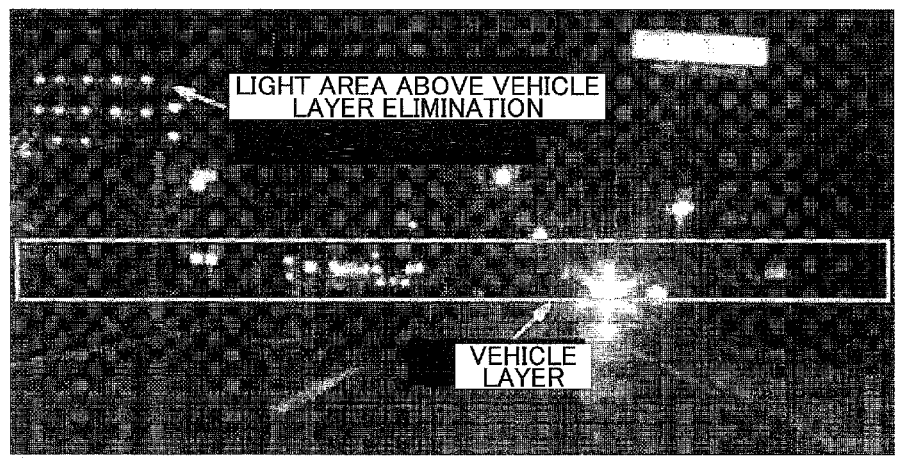
FIG. 5 is a diagram illustrating the vehicle layer extraction according to the embodiment of the present invention.

In step S420, the moving light area appearing above the vehicle layer is eliminated. For example, the lights appearing above the vehicle layer are eliminated as noise light. If the numbers of lights in all layers are less than the threshold, no vehicle layer is detected. FIG. 5 illustrates the detection of the vehicle layer.

However, it should be noted that the vehicle layer detection is a required step.

Figure 6:
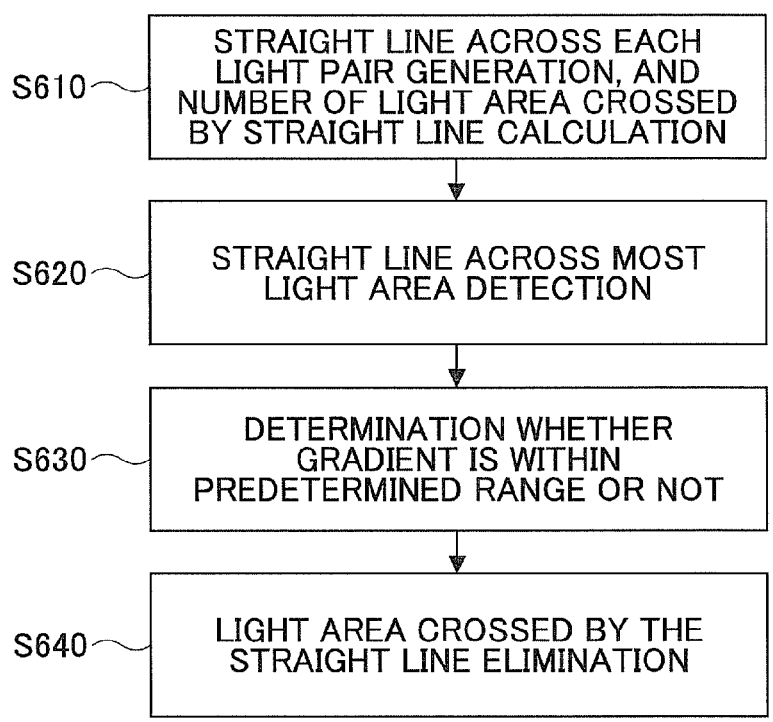
FIG. 6 is a flowchart illustrating the reflection plate detection according to the embodiment of the present invention.

Next, FIG. 6 is a flowchart illustrating the reflection plate detection.

In step 610, in the first image, straight lines across each light area pair are generated, the gradients of the straight lines are calculated, and the numbers of lights crossed by the straight lines are calculated.

As an example, (a1, b1) and (a2, b2) respectively represent central points of the two lights in the light area pair, and the gradient of the straight line across the light area pair is calculated according to the following formula (4), $$k=(b2-b1)/(a2-a1)$$

and the coordinates (0, b) of the intersection between the straight line and y axis is calculated according to the following formula (5).

$$b=b2-k\times a2$$

Next, in step S620, the straight line across most lights is detected. Preferably, the straight line may be associated with the lights crossed by the straight line.

Figure 8:
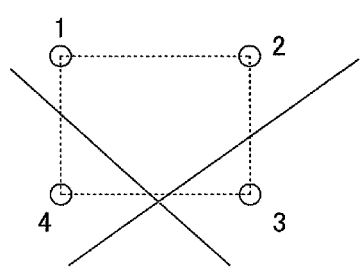
FIG. 8 is a diagram illustrating the determination whether the light area is crossed by the straight line according to the embodiment of the present invention.

For example, suppose that the lights are represented by four points (as shown in FIG. 8), and $(x_1, y_1)$, $(x_2, y_2)$, $(x_3, y_3)$, $(x_4, y_4)$ represent respectively the coordinates of the four points. If the following formula (one of the following two formulas (6) and (7)) is met, it is judged that the straight line crosses the light.

$$(y_1-kx_1-b)\times(y_3-kx_3-b)<0$$

$$(y_2-kx_2-b)\times(y_4-kx_4-b)<0$$

Next, in steps S630 and S640, if the gradient of the straight line across most lines is within a predetermined gradient range, lights crossed by the straight line across most lights are removed.

As an example, if the gradient k of the straight line is within a predetermined gradient range, such as k>0.5 or k<−0.5, lights crossed by the straight line are removed as the noise light.

Figure 7:
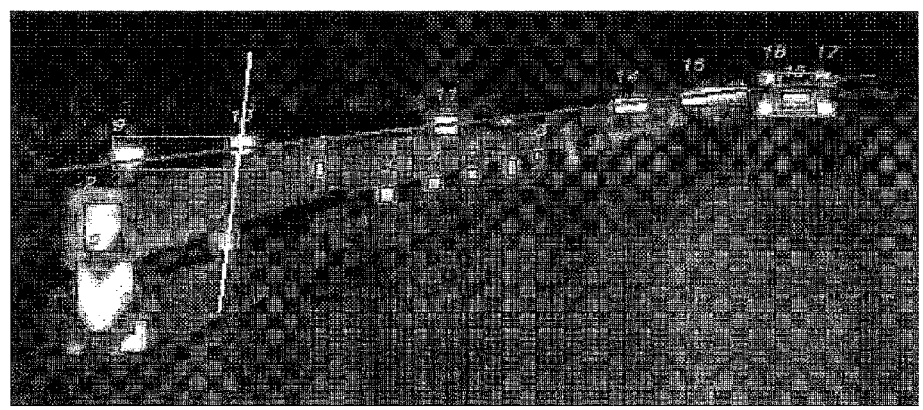
FIG. 7 is a diagram illustrating the reflection plate removal according to the embodiment of the present invention.

As shown in FIG. 7, lights on the straight line in which light pair 9 and 10 are located, namely, lights 9, 10, 11, 14 and 16 are removed.

Furthermore, the front vehicle detecting method according to the embodiment of the present invention preferably further comprises a vehicle chasing step. In the vehicle chasing step, the vehicle location of the first image of the at least one image obtained at the current time is calculated, based on the vehicle location detected from the first image of the at least one image obtained at the previous time.

As an example, a template matching method is used in the chasing step. In other words, in the current image, the histogram of each image block is calculated in the neighborhood thereof based on the vehicle location detected from the image obtained at the previous time, and the calculated histogram is compared with the histogram of the vehicle image block detected from the image obtained at the previous time. The calculating formula (8) is as follows.

$$SD = \sum_{i=1}^{bins} (H_{k,t}[i] - H_{t-1}[i])^2$$

In formula (8), SD is the distance between the two histograms, $H_{k,t}[i]$ is the i-th value of histogram of the k-th neighborhood image block in the current image, $H_{t-1}[i]$ is the i-th value of histogram of the vehicle image block extracted from the image obtained at the previous time, and bins is the number of grey level of histograms, such as 256. The area having a smallest SD value is the forecasted location of the vehicle. If the smallest SD value is still more than a predetermined threshold, it is considered that the vehicle detected from the image obtained at the previous time has vanished in the current image so that no matching result exists in the current image.

As another example, a Kalman filter method may be used in the chasing step, wherein, the speed of the detected vehicle is estimated, and the most probable location that the vehicle detected from the image obtained at the previous time appears in the current image is estimated; so that, a small search scope of the current image is determined and the vehicle location is forecasted in this scope by the template matching method.

Figure 9:
FIG. 9 is a diagram illustrating an application example of the front vehicle detecting method according to the embodiment of the present invention.

Next, FIG. 9 is a diagram illustrating an application example of the front vehicle detecting method.

It is possible to detect automatically the front vehicle of the own vehicle, by using the front vehicle detecting method according to the embodiment of the present invention. For the own vehicle, it is capable of switching automatically high-beam and low-beam (such as long-distance light and short-distance light) of the headlight of the vehicle based on the detection result.

As an application example, if there is no vehicle in the range of front vision, high-beam (long-distance light) is turned on automatically; if the front vehicle is detected, the headlight is switched automatically to the status of low-beam (short distance light). According to this application, it is capable of providing better front vision for the driver of the own vehicle, and maximally reducing the interference to other drivers.

As another application example, the own vehicle may control automatically the area of light irradiation, use low-beam only in the area that the vehicle is detected and use high-beam in other areas (as shown in FIG. 9).

As described above, it is possible to detect automatically the front vehicle of the own vehicle by using the front vehicle detecting method according to the embodiment of the present invention. In the own vehicle, it is possible to perform Auto Cruise Control (ACC) or Forward Collision Warning (FCW), etc., based on the detected front vehicle.

Figure 10:
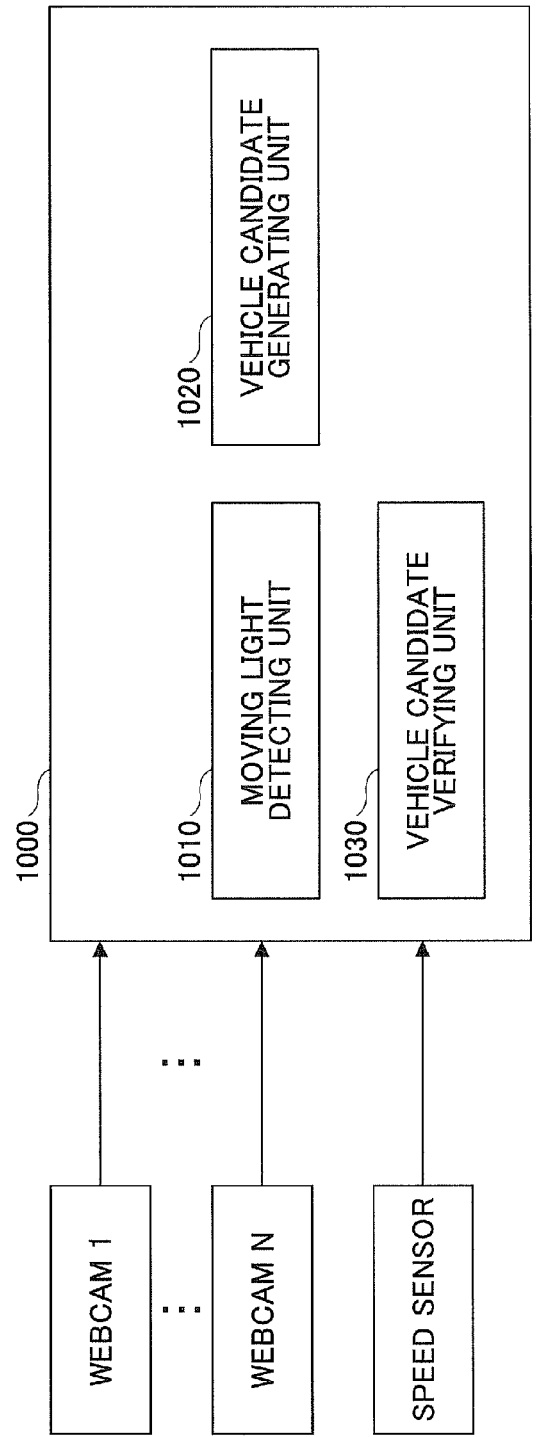
FIG. 10 is a block diagram illustrating the front vehicle detecting apparatus according to the embodiment of the present invention.

Next, FIG. 10 is a block diagram illustrating the front vehicle detecting apparatus 1000 according to the embodiment of the present invention.

The front vehicle detecting apparatus 1000 according to the embodiment of the present invention receives an image of the front vision of the own vehicle picked up by at least one webcam, and processes at least one received image so as to detect the front vehicle of the own vehicle.

Preferably, the at least one webcam may be at least two webcams such as a binocular webcam. The binocular webcam may be installed in the position near the back mirror of the vehicle so as to capture the image of the front scene of the own vehicle.

The front vehicle detecting apparatus 1000 comprises a moving light detecting unit 1010, a vehicle candidate generating unit 1020, and a vehicle candidate verifying unit 1030.

The moving light detecting unit 1010 detects the front moving light area of the own vehicle through at least one image of the front scene of the own vehicle obtained at a time.

The vehicle candidate generating unit 1020 extracts the light area pair from the detected front moving light area so that the front vehicle candidate is generated.

The vehicle candidate verifying unit 1030 verifies that the front vehicle candidate is the front vehicle in cases where the front vehicle candidate meets predetermined characteristics of a vehicle light.

As an example, the vehicle candidate verifying unit 1030 may verify the front vehicle candidate by a Support Vector Machine (SVM). In the SVM classifier, the image characteristics (such as length-width ratio, histogram, edge characteristics, and projection characteristics, etc.) have been stored (trained). The vehicle candidate verifying unit 1030 receives each of the obtained front vehicle candidates, extracts the above characteristics from the front vehicle candidates, and inputs the extracted characteristics into the SVM classifier of the vehicle candidate verifying unit 1030. After that, the SVM classifier outputs 1 or −1 to determine whether the front vehicle candidate is a vehicle light (vehicle) or not.

As another example, the vehicle candidate verifying unit 1030 may verify the front vehicle candidate by Principal Component Analysis (PCA). In the PCA, eigenvectors of the vehicle image space and the eigenspace consisting of the eigenvectors have been stored (trained), and there is another set of vehicle light images in the projecting vector collection T of the eigenspace. The vehicle candidate verifying unit 1030 receives the obtained each of front vehicle candidates, the PCA of the vehicle candidate verifying unit 1030 projects the front vehicle candidates to the eigenspace so as to obtain the projecting vectors and calculates the distances between the projecting vectors and each of projecting vectors in the projecting vector collection T. If minimum distance is less than a predetermined threshold, the vehicle candidate verifying unit 1030 verifies the front vehicle candidate as the detected front vehicle.

Figure 11:
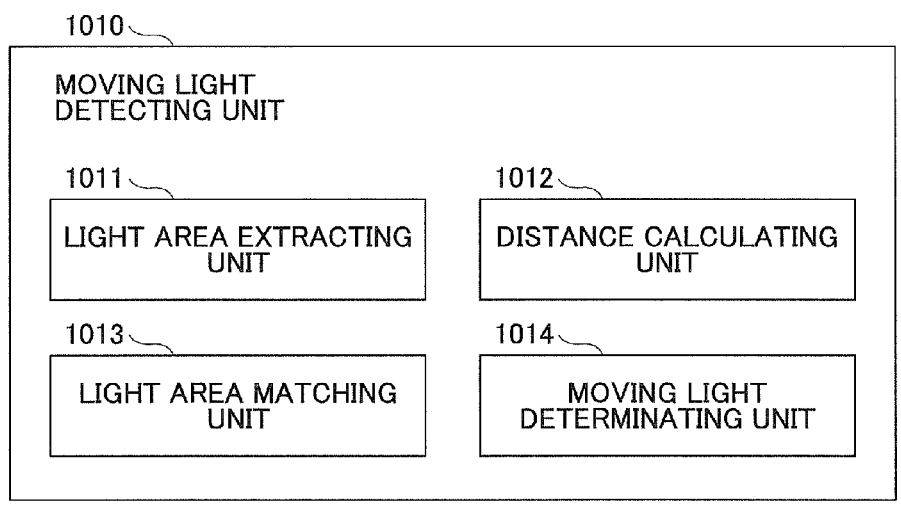
FIG. 11 is a block diagram illustrating the moving light detecting unit according to the embodiment of the present invention.

FIG. 11 is a block diagram illustrating the moving light detecting unit 1010 according to the embodiment of the present invention.

The moving light detecting unit 1010 comprises a light area extracting unit 1011, a distance calculating unit 1012, a light area matching unit 1013, and a moving light determining unit 1014.

The light area extracting unit 1011 extracts a light area through a first image of the at least one image.

The distance calculating unit 1012 calculates the distance $D_t$ between the extracted light area and the vehicle.

The light area matching unit 1013 performs the matching between the extracted light area and a light area of a first image of at least one image obtained at a previous time.

As an example, the light area matching unit 1013 compares histograms of each of the extracted light areas with histograms of each image block in the nearest areas of the corresponding image obtained at a previous time so as to determine the smallest SD value according to the above formula (1), by the method of template matching. If the smallest SD value is less than a predetermined threshold, it is considered a successful match between the extracted light area and the image block (namely, light area) corresponding to the smallest SD value in the nearest areas.

The moving light determining unit 1014 determines the extracted light area as the front moving light area in cases where the extracted light area meets predetermined characteristics of the moving light area.

As an example, the moving light determining unit 1014 calculates the moving speed $V_{light}$ of the extracted light area according to the above formula (2), by using the distance $D_t$, the distance $D_{t-1}$ between light area matched at the previous time and the own vehicle, and the moving speed $V_t$ of the own vehicle. And then, the moving light determining unit 1014 determines whether the moving speed is more than a predetermined threshold, and determines the light area that the moving speed is more than the predetermined threshold as the front moving light area.

As another example, the moving light determining unit 1014 may determine whether the size of the extracted light area is less than the size of a corresponding light area of a corresponding image obtained at the previous time or not. And then, the moving light determining unit 1014 determines the extracted light area as the front moving light area, if the size of the extracted light area is less than the size of the corresponding light area of the corresponding image obtained at the previous time.

As another example, the moving light determining unit 1014 may determine whether the distance between the extracted light area and a vanishing point is less than the distance between a corresponding light area of a corresponding image obtained at the previous time and the vanishing point or not. And then, the moving light determining unit 1014 determines the extracted light area as the front moving light area and considers that the moving light area goes forward (namely, the same direction with the own vehicle), if the distance between the extracted light area and the vanishing point is less than the distance between the corresponding light area of the corresponding image obtained at the previous time and the vanishing point.

Preferably, the moving light detecting unit 1010 according to the embodiment of the present invention also comprises a binarization unit (not shown in the drawings). The binarization unit converts the first image (it is a grey level image, or it is converted to a grey level image in advance) of the at least one image to a binarized image. In this case, the light area extracting unit 1011 extracts the light area from the generated binarized image. However, it should be noted that the binarization unit is a required component of the front vehicle detecting apparatus 1000 according to the embodiment of the present invention.

The binarization unit compares each pixel value of the grey level image of the first image of the at least one image with a predetermined threshold T_Binarization, and sets the grey level of the current pixel to 255 if the grey level of the current pixel is more than the threshold, otherwise sets the pixel value to 0; thus, the corresponding binarized image is generated.

In this case, as an example, the light area extracting unit 1011 obtains the location and the size of all of the connect components (connect area) of the image by Connected Component Analysis (CCA), calculates the width and the height of each connect component, and determines the connect component as a possible light area if the connect component meets the above condition (formula (3)).

Figure 12:
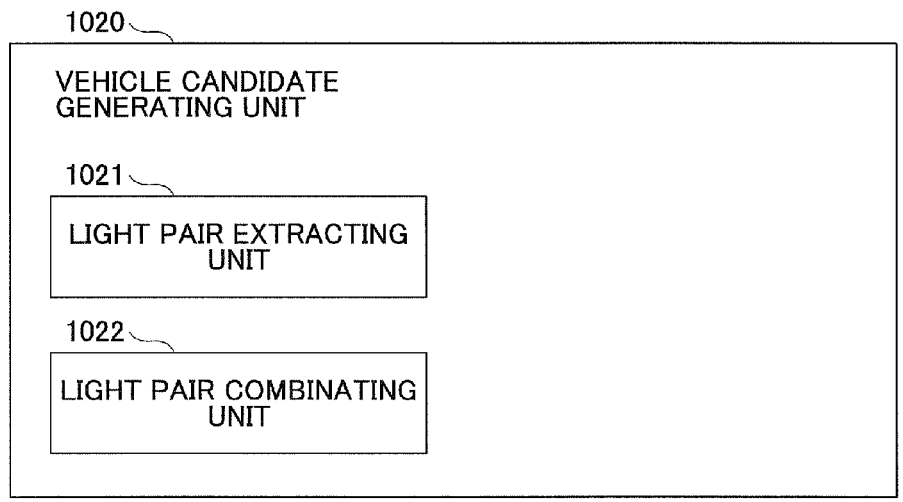
FIG. 12 is a block diagram illustrating the vehicle candidate generating unit according to the embodiment of the present invention.

FIG. 12 is a block diagram illustrating the vehicle candidate generating unit 1020 according to the embodiment of the present invention.

The vehicle candidate generating unit 1020 comprises a light pair extracting unit 1021 and a light pair combining unit 1022.

The light pair extracting unit 1021 constitutes the light area pair by approximate symmetric light areas having a similar speed in a first image of the at least one image.

The light pair combining unit 1022 combines (merges) the light areas that constitute the light area pair into one area so as to obtain the front vehicle candidate. In addition, preferably, if the two light areas overlap each other in the vertical direction and the ratio of length to width of the bounding box rectangle consisting of the two light areas is less than a predetermined threshold, the light pair combining unit 1022 combines the two light areas into one area.

Figure 13:
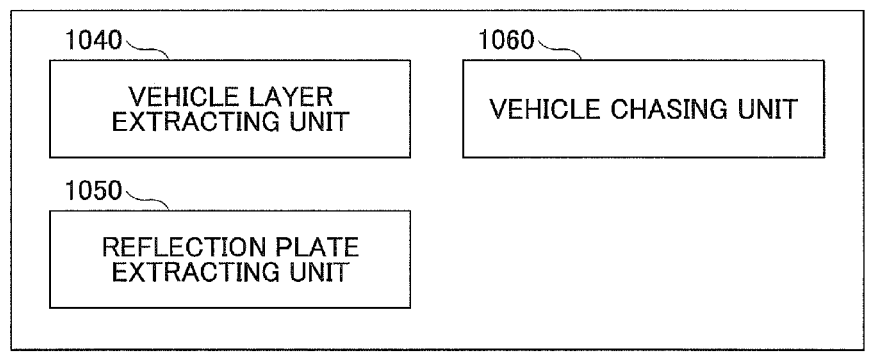
FIG. 13 is a block diagram illustrating other component units that may be included in the front vehicle detecting apparatus according to the embodiment of the present invention.

Next, FIG. 13 is a block diagram illustrating other component units that may be included in the front vehicle detecting apparatus 1000 according to the embodiment of the present invention.

The front vehicle detecting apparatus 1000 according to the embodiment of the present invention may also comprise a vehicle layer extracting unit 1040, a reflection plate extracting unit 1050 and a vehicle chasing unit 1060.

The vehicle layer extracting unit 1040 detects the vehicle layer from the first image of the at least one image. For example, the first image is divided into several layers in the horizontal direction from top to bottom, and the numbers of lights in each layer are calculated. If the number of lights in the layer having most lights is more than a predetermined threshold, the layer is defined as the vehicle layer. After that, the vehicle layer extracting unit 1040 eliminates the moving light area appearing above the vehicle layer. For example, the lights (such as lights of buildings and street lights) appearing above the vehicle layer are eliminated as noise light. If the numbers of lights in all layers are less than the threshold, the vehicle layer extracting unit 1040 determines that no vehicle layer is detected and does not eliminate any lights accordingly.

The reflection plate extracting unit 1050 preferably comprises a straight line generating unit, a reflection plate straight line detecting unit and a reflection plate removing unit.

In the first image, the straight line generating unit generates straight lines across each light area pair extracted by the light pair extracting unit 1021, and calculates the numbers of lights crossed by the straight lines based on the above formulas (4) and (5).

The reflection plate straight line detecting unit detects the straight line across most lights.

The reflection plate removing unit determines whether the gradient of the straight line detected by the reflection plate straight line detecting unit is within a predetermined gradient range, and removes lights crossed by the straight line across most lights if the gradient is within a predetermined gradient range.

As an example, if the gradient k of the straight line is within a predetermined gradient range, such as k>0.5 or k<−0.5, The reflection plate removing unit removes lights crossed by the straight line as the noise light.

The vehicle chasing unit 1060 calculates the vehicle location of the first image of the at least one image obtained at the current time, based on the vehicle location detected from the first image of the at least one image obtained at the previous time.

As an example, the vehicle chasing unit 1060 uses a template matching method, namely, in the current image, calculates the histogram of each image block in the neighborhood thereof based on the vehicle location detected from the image obtained at the previous time, and compares the calculated histogram with the histogram of the vehicle image block detected from the image obtained at the previous time based on the above formula (8). The area having a smallest SD value is the forecasted location of the vehicle. If the smallest SD value is still more than a predetermined threshold, it is considered that the vehicle detected from the image obtained at the previous time has vanished in the current image.

As another example, the vehicle chasing unit 1060 may use a Kalman filter method, namely, the speed of the detected vehicle is estimated, and estimates the most probable location that the vehicle detected from the image obtained at the previous time appears in the current image; thereby, a small search scope of the current image is determined and the vehicle location is forecasted to be in this scope by the template matching method.

Figure 14:
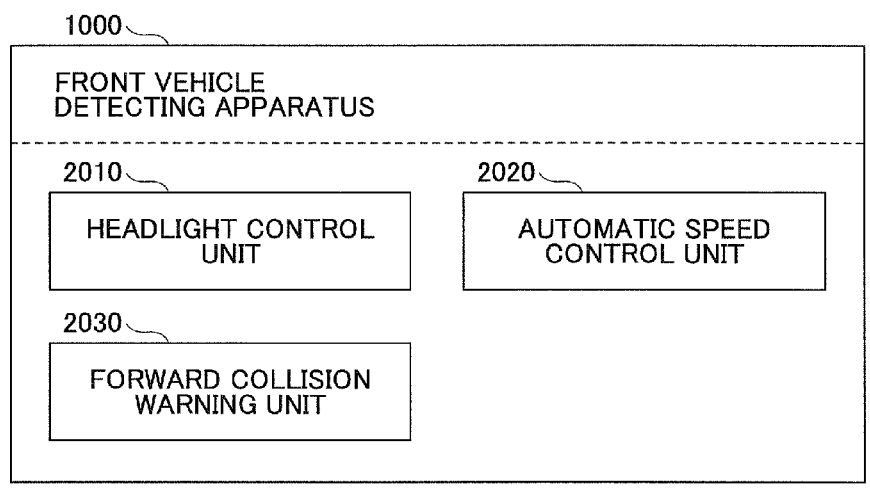
FIG. 14 is a diagram illustrating an application example of the front vehicle detecting apparatus according to the embodiment of the present invention.

FIG. 14 is a diagram illustrating an application example of the front vehicle detecting apparatus 1000 according to the embodiment of the present invention.

Figure 15:
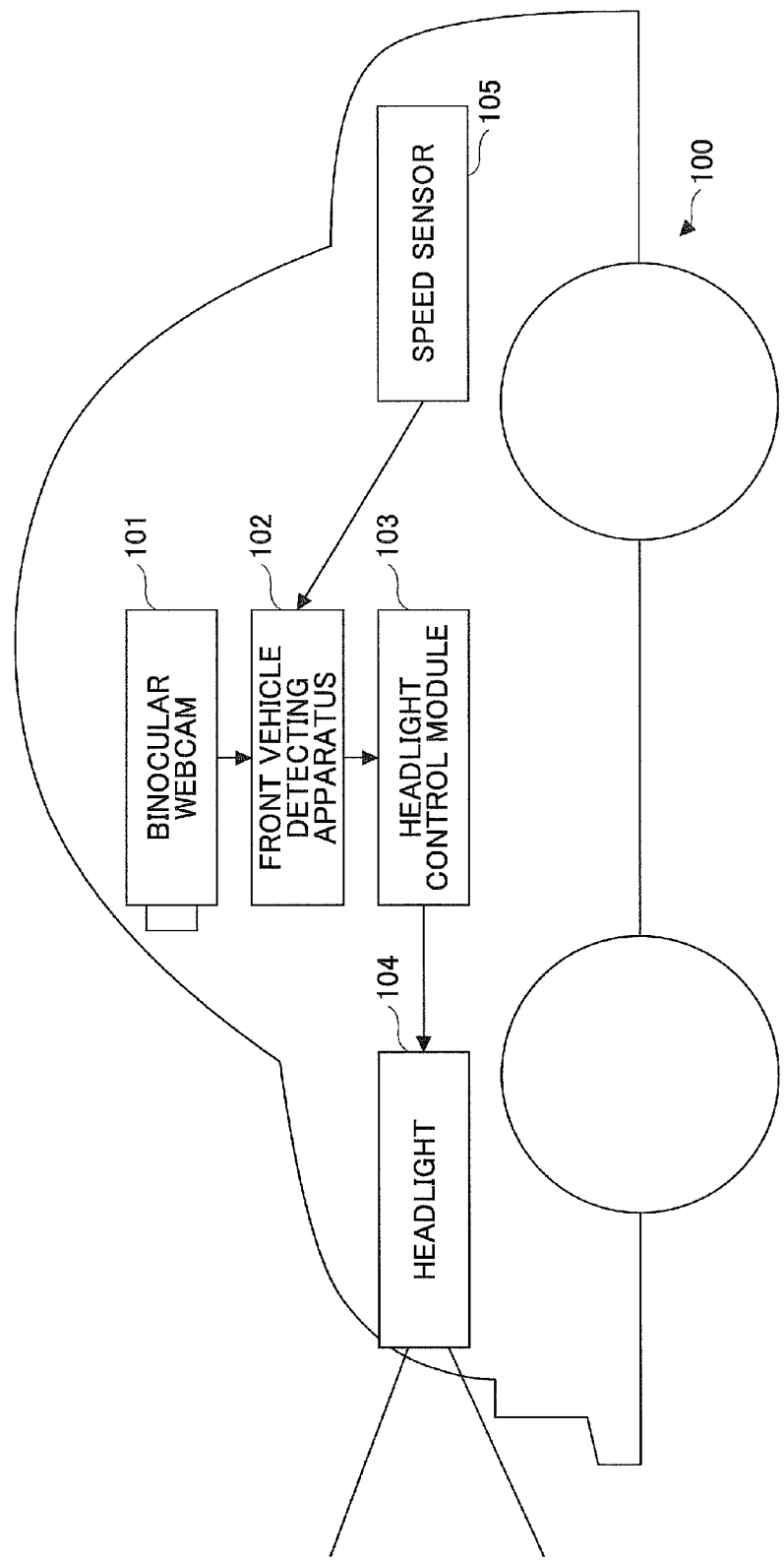
FIG. 15 is a diagram illustrating a vehicle headlight control system utilizing nighttime front vehicle detection.

As shown in FIG. 15, the front vehicle detecting apparatus 1000 according to the embodiment of the present invention may be used with a headlight control unit 2010 so as to form a vehicle headlight control system 100.

The vehicle headlight control system 100 comprises a binocular webcam 101, a front vehicle detecting apparatus 102, a headlight control module 103 (such as the headlight control unit 2010), headlights 104 and a speed sensor 105.

The binocular webcam 101 is located in the position of the back mirror of the vehicle. The front vehicle detecting apparatus 102 consists of the front vehicle detecting apparatus 1000 according to the embodiment of the present invention.

The headlight control module 103 is able to receive the detection result of the front vehicle from the front vehicle detecting apparatus 102 and switch automatically high-beam and low-beam (such as long-distance light and short-distance light) based on the detection result.

For example, if there is no vehicle in the range of front vision, the headlight control module 103 turns on high-beam (long-distance light) automatically; if the front vehicle is detected, the headlight control module 103 switches the headlight to the status of low-beam (short distance light) automatically. According to this application, the embodiment is capable of providing a better front vision for the driver of the own vehicle, and maximally reducing the interference to other drivers.

As another example, the headlight control module 103 may control automatically the area of light irradiation, use low-beam only in the area that the vehicle is detected and use high-beam in other areas (as shown in FIG. 9).

Furthermore, the front vehicle detecting apparatus 1000 according to the embodiment of the present invention may be used with an automatic speed control unit 2020 so as to form an automatic speed control system.

Furthermore, the front vehicle detecting apparatus 1000 according to the embodiment of the present invention may be used with a forward collision warning unit 2030 so as to form a forward collision warning system.

The front vehicle detecting method and apparatus are not limited to the above application.

According to the front vehicle detecting method and apparatus of the embodiment of the present invention, the moving speed of lights is estimated based on the images obtained at two different time, the moving lights are detected based on the estimated moving speed, and the "noise lights" are also removed based on the characteristics of the vehicle light, so that the front vehicle of the own vehicle is accurately detected.

It should be noted that the front vehicle detecting method and apparatus described above may be implemented by various ways such as hardware, software, firmware, exclusive processor, or a combination of those.

It also should be noted that some of system components and methods shown in the drawings may be preferably implemented by software, so that the actual connection among these system components and processing functional block can be different based on the programming method of the present invention. The implementation and the configuration for the present invention are well-known in the art.

The present invention is not limited to the specifically disclosed embodiments, and variations and modifications may be made without departing from the scope of the present invention.

The present application is based on Chinese Priority Application No. 201110297126.6 filed on Sep. 30, 2011, the entire contents of which are hereby incorporated herein by reference.

What is claimed is:

1. A method for detecting a front vehicle, comprising:
    detecting a front moving light area of an own vehicle in at least one image of a front scene of the own vehicle obtained at a time;
    detecting a vehicle layer from a first image of the at least one image, the detecting the vehicle layer including,
        dividing the first image into a plurality of layers,
        determining a number of lights in each of the plurality of layers,
        determining a selected layer of the plurality of layers, the selected layer having a highest number of lights among the plurality of layers,
        determining whether the highest number of lights exceeds a threshold, and
        determining the vehicle layer based on whether the highest number of lights exceeds the threshold, and
        eliminating a moving light area appearing above the vehicle layer from the front moving light area;
    extracting a light area pair from the front moving light area generated from the eliminating such that a front vehicle candidate is generated; and
    verifying that the front vehicle candidate is the front vehicle in cases where the front vehicle candidate meets characteristics of a vehicle light.

2. The method according to claim 1, further comprising:
    a vehicle chasing step of matching a location of the front vehicle determined in the first image of the at least one image to a location of the front vehicle determined in a first image of at least one image obtained at a previous time so as to track the location of the front vehicle.

3. A method for detecting a front vehicle, comprising:
    a moving light detecting step of detecting a front moving light area of an own vehicle in at least one image of a front scene of the own vehicle obtained at a time;
    a vehicle candidate generating step of extracting a light area pair from the detected front moving light area so that a front vehicle candidate is generated; and
    a vehicle candidate verifying step of verifying that the front vehicle candidate is the front vehicle in cases where the front vehicle candidate meets characteristics of a vehicle light;
    wherein the vehicle candidate generating step includes,
        a light pair extracting step of identifying the light area pair by approximately symmetric light areas having a similar speed in a first image of the at least one image,
    a step of generating a straight line across each possible light area pair, calculating the gradients of the straight lines, and calculating the numbers of lights crossed by the straight lines;
        a step of detecting the straight line that crosses most lights; and
        a step of removing the lights crossed by the straight line that crosses the most lights in cases where the gradient of the straight line that crosses the most lights is within a gradient range to generate the light area pair; and
    a light pair combining step of combining the light areas that constitute the light area pair into one area so that the front vehicle candidate is obtained.

4. An apparatus for detecting a front vehicle, comprising:
    a moving light detecting unit configured to detect a front moving light area of an own vehicle in at least one image of a front scene of the own vehicle obtained at a time;
    a vehicle layer extracting unit configured to detect a vehicle layer from a first image of the at least one image, the detecting the vehicle layer including,
        dividing the first image into a plurality of layers,
        determining a number of lights in each of the plurality of layers,
        determining a selected layer of the plurality of layers, the selected layer having a highest number of lights among the plurality of layers,
        determining whether the highest number of lights exceeds a threshold, and
        determining the vehicle layer based on whether the highest number of lights exceeds the threshold, the front vehicle candidate being based on the vehicle layer, and
        eliminating a moving light area appearing above the vehicle layer from the front moving light area;

a vehicle candidate generating unit configured to extract a light area pair from the front moving light area generated from the eliminating such that a front vehicle candidate is generated; and a vehicle candidate verifying unit configured to verify that the front vehicle candidate is the front vehicle in cases where the front vehicle candidate meets characteristics of a vehicle light.

5. The apparatus according to claim 4, further comprising:

a vehicle chasing unit for matching a location of the front vehicle determined in the first image of the at least one image to a location of the front vehicle determined in a first image of at least one image obtained at a previous time so as to track the location of the front vehicle.

6. An apparatus for detecting a front vehicle, comprising:

a moving light detecting unit configured to detect a front moving light area of an own vehicle in at least one image of a front scene of the own vehicle obtained at a time;

a vehicle candidate generating unit configured to extract a light area pair from the front moving light area generated from the eliminating such that a front vehicle candidate is generated;

a vehicle candidate verifying unit configured to verify that the front vehicle candidate is the front vehicle in cases where the front vehicle candidate meets characteristics of a vehicle light, wherein the vehicle candidate generating unit is configured to extract the light area pair from approximately symmetric light areas having a similar speed in a first image of the at least one image, generate a straight line across each possible light area pair, calculating the gradients of the straight lines, and calculating the numbers of lights crossed by the straight lines, detect the straight line that crosses most lights, and a step of remove the lights crossed by the straight line that crosses the most lights in cases where the gradient of the straight line that crosses the most lights is within a gradient range to generate the light area pair; and a light pair combining unit configured to combine the light areas that constitute the light area pair into one area so that the front vehicle candidate is obtained.

\* \* \* \* \*